United States Patent

Moser et al.

[11] Patent Number: 6,148,802
[45] Date of Patent: Nov. 21, 2000

[54] METHOD FOR OPERATING AN INTERNAL COMBUSTION ENGINE, ESPECIALLY OF AN AUTOMOBILE

[75] Inventors: Winfried Moser, Ludwigsburg; Matthias Philipp, Vaihingen, both of Germany

[73] Assignee: Robert Bosch GmbH, Stuttgart, Germany

[21] Appl. No.: 09/202,120

[22] PCT Filed: Jun. 30, 1997

[86] PCT No.: PCT/DE98/01794

§ 371 Date: Mar. 4, 1999

§ 102(e) Date: Mar. 4, 1999

[87] PCT Pub. No.: WO99/01657

PCT Pub. Date: Jan. 14, 1999

[30] Foreign Application Priority Data

Jul. 4, 1997 [DE] Germany .............................. 197 28 554

[51] Int. Cl.$^7$ ................................................... F02M 33/04
[52] U.S. Cl. ........................... 123/518; 123/520; 123/304
[58] Field of Search .................................. 123/516, 518, 123/519, 520, 304

[56] References Cited

U.S. PATENT DOCUMENTS 5,170,759  12/1992  Ito .......................................... 123/304
5,479,906  1/1996  Collie ...................................... 123/304

FOREIGN PATENT DOCUMENTS

| 0 488 254 | 6/1992 | European Pat. Off. . |
| 2759420 | 8/1998 | France . |
| 3935442 | 11/1990 | Germany . |
| 195 47 916 | 6/1997 | Germany . |
| 196 50 517 | 6/1998 | Germany . |
| 10-047172 | 2/1998 | Japan . |

*Primary Examiner*—Thomas N. Moulis
*Attorney, Agent, or Firm*—Walter Ottesen

[57] ABSTRACT

An internal combustion engine especially for a motor vehicle is described which is provided with an injection valve (11) with which fuel from a tank (3) can be injected directly into a combustion chamber either in a first mode of operation (S) during a compression phase or in a second mode of operation (H) during an induction phase. Furthermore, the internal combustion engine is provided with a control apparatus (10) for controlling (open loop and/or closed loop) the engine. A line (13) is provided via which vaporized fuel from the tank (3) can be conducted into the combustion chamber in the second mode of operation (H).

13 Claims, 3 Drawing Sheets

METHOD FOR OPERATING AN INTERNAL COMBUSTION ENGINE, ESPECIALLY OF AN AUTOMOBILE

FIELD OF THE INVENTION

The invention relates to a method of operating an internal combustion engine as well as an internal combustion engine especially for a motor vehicle wherein fuel from a tank is injected directly into a combustion chamber either in a first mode of operation during a compression phase or in a second mode of operation during an induction phase.

BACKGROUND OF THE INVENTION

One system of this kind for directly injecting fuel into the combustion chamber of an internal combustion engine is generally known. A so-called stratified charge operation as a first mode of operation and a so-called homogeneous operation as a second mode of operation are distinguished. The stratified operation is used especially for smaller loads; whereas, the homogeneous operation is utilized for larger loads applied to the engine. In stratified operation, the fuel is injected during the compression phase of the engine into the combustion chamber and there, directly into the vicinity of a spark plug. This has the consequence that no uniform distribution of the fuel in the combustion chamber can take place; instead, the fuel is immediately ignited by the spark plug. The advantage of stratified operation lies in that applied lower loads can be carried by the engine with a very small quantity of fuel. Larger loads can, however, not be satisfied with stratified operation. In homogeneous operation, which is provided for such larger loads, the fuel is injected during the induction phase of the engine so that a swirling and therefore a distribution of the fuel in the combustion chamber can still easily take place. Insofar, the homogeneous operation corresponds approximately to the operation of internal combustion engines wherein fuel is injected into the intake manifold in a conventional manner.

SUMMARY OF THE INVENTION

The object of the invention is to provide a method for operating an internal combustion engine as well as an internal combustion engine with which a further fuel reduction is possible.

This object is solved in a method of the initially mentioned type by the invention in that vaporized fuel is supplied to the combustion chamber in the second mode of operation from the tank. For this purpose, and according to the invention, a corresponding line is provided for an internal combustion engine of the initially mentioned type.

The fuel, which is vaporized from the tank, is therefore trapped and supplied via the line to the combustion chamber and therefore to the combustion. In this way, it is achieved that the vaporized fuel does not escape into the atmosphere and so remains unused; instead, it is achieved that this vaporized fuel is also used for driving the engine. Overall, this not only has the advantage of a further fuel reduction but also a lesser burden on the environment because of the operation of the engine.

The vaporized fuel is however not continuously supplied to the combustion chamber; instead, it is supplied only under specific conditions. According to the invention, the vaporized fuel is supplied to the combustion chamber only during the second mode of operation, that is, during the homogeneous mode of operation of the engine. In this way, it is avoided that too much fuel reaches the combustion chamber in the first mode of operation, that is, during the stratified operation.

As explained, the fuel can no longer distribute in the combustion chamber in stratified operation so that, for too large a fuel quantity, an incomplete combustion would take place in the combustion chamber. This would not only lead to an unnecessarily high fuel consumption, but also to an unwanted high generation of exhaust gas.

Because of the supply of vaporized fuel according to the invention only during homogeneous operation and not during stratified operation, the advantage of the fuel reduction because of this supply during the homogeneous operation is achieved, on the one hand, whereas, on the other hand, the disadvantage of an incomplete combustion and the like is avoided during the stratified operation.

In an advantageous improvement of the invention, the vaporized fuel is conducted through an active charcoal filter and the charge of the active charcoal filter is determined. The active charcoal filter serves to trap the vaporized fuel. This active charcoal filter must be continuously regenerated during operation of the engine so that it does not overflow. For this purpose, the charge of the active charcoal filter, that is, its fill level is determined with the aid of the lambda control. In this way, the engine can be so controlled (open loop and/or closed loop) that an overflow of the active charcoal filter is reliably avoided.

In an advantageous embodiment of the invention, the second mode of operation is maintained until the charge of the active charcoal filter is less than a pregiven second value. In this way, it is achieved that, for a charge of the active charcoal filter which is too high, the engine is still operated in homogeneous operation until the charge has again dropped to below the above-mentioned second value. An overflow of the active charcoal filter is likewise avoided with this procedure.

It is especially purposeful when this second mode of operation is only then maintained when the charge of the active charcoal filter was greater previously than a pregiven first value. In this way, a short sequential back-and-forth switching between the modes of operation is avoided. A hysteresis for maintaining the homogeneous operation is thereby provided which prevents unwanted switchover operations.

In an advantageous configuration of the invention, after the start of the engine, a check is made as to whether a determination of the charge of the active charcoal filter is present and, in the event that no determination is present, the engine is transferred into the second mode of operation after a pregiven time duration. After the start, the charge of the active charcoal filter must be determined in order to avoid an overflow. A determination of the charge of this kind is, however, only possible under specific preconditions, such as only in homogeneous operation and under specific steady-state conditions. According to the invention, a check is now made as to whether a determination of the charge of the active charcoal filter has taken place. If this is the case, then this value of the charge is used further. If this is, however, not the case, then, after a pregiven time duration, the engine is controlled (open loop and/or closed loop) such that the charge can be determined. For this purpose, the engine is transferred into the homogeneous operation wherein the charge of the active charcoal filter can be determined in any case. In total, it is ensured in this manner that the charge of the active charcoal filter can be determined after the start of the engine within the pregiven time duration and, in this way, the charge can be used for the control (open loop and/or closed loop) of the engine and especially for the supply of vaporized fuel to the combustion chamber.

It is especially purposeful when the time duration is computed starting with the last present determination of the charge. In this way, it can be considered as to whether the engine has been switched off for a longer time duration or a shorter time duration. If the engine has been in the switched-off state for a longer time duration, the pregiven time duration is exceeded and it is assumed that the active charcoal filter has filled with fuel in this longer time duration. For this reason, the engine is controlled (open loop and/or closed loop) in this case immediately in homogeneous operation. However, if the engine was switched off only for a shorter time duration, then the engine is not forcibly transferred into the homogeneous operation; instead, a check is first made as to whether the charge can be determined without this measure. Only when, after the pregiven time duration has elapsed, the charge of the filter has not been determined, then the engine is controlled (open loop and/or closed loop) into the homogeneous operation.

Likewise, it can be especially purposeful when the time duration is computed starting with the start of the engine. In this way, and according to the invention, an attempt is made for the specific time duration whether a charge of the active charcoal filter can be determined. If this is the case, then this value of the charge is further utilized. Only if the charge of the active charcoal filter was not determined after the elapse of the pregiven time duration, is the engine controlled (open loop and/or closed loop) into the homogeneous operation. This possibility permits, on the one hand, a rapid determination of the charge of the charcoal filter and, on the other hand, the warmup running of the engine can take place at least partially in the fuel-reducing stratified operation.

In an advantageous improvement of the invention, the second mode of operation is retained until a determination of the charge of the active charcoal filter is present. In this way, the determination of the charge is forcibly effected in each case so that thereafter, in each case, further processing can take place with a value for the charge of the active charcoal filter.

In another advantageous embodiment of the invention, the engine is transferred after the start into the second mode of operation until a determination of the charge of the active charcoal filter is present. In this case, the elapse of a time duration is not first awaited as to whether a charge can be determined even without the transition into the homogeneous operations; instead, a transfer into the homogeneous operation is made immediately in order to determine in this way immediately the charge of the active charcoal filter.

The realization of the invention in the form of an electric storage medium, which is provided for a control apparatus of an engine especially of a motor vehicle, is of special significance. A program is stored on the electric storage medium, which can be run on a computer apparatus, especially on a microprocessor, and is suitable for carrying out the method of the invention. In this case, the invention is realized by a program stored on the electric storage medium so that this storage medium, which is provided with the program, defines the invention in the same way as the method, with the program being suitable for carrying out the method.

BRIEF DESCRIPTION OF THE DRAWINGS

The invention will now be described with reference to the drawing wherein.

DESCRIPTION OF THE PREFERRED EMBODIMENTS OF THE INVENTION

Figure 1:
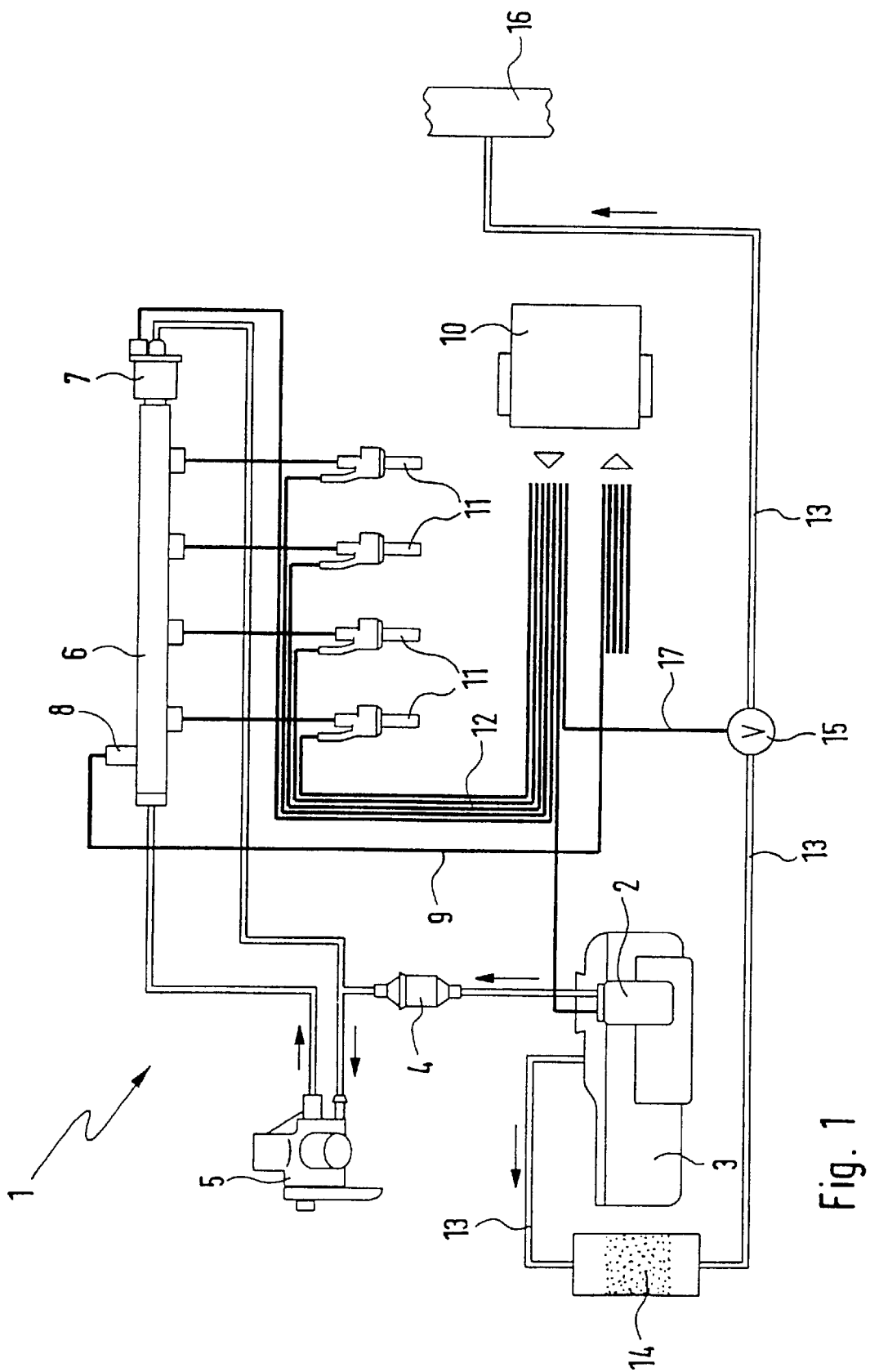
FIG. 1 shows a schematic block circuit diagram of an embodiment of a system of the invention for operating an internal combustion engine of a motor vehicle.

In FIG. 1, a fuel supply system 1 of an engine is shown which is provided for use in a motor vehicle. The engine has four cylinders and therefore four combustion chambers. The engine is an embodiment wherein the fuel, preferably gasoline, is injected directly into the combustion chambers.

By a pump 2, the fuel is transported out of a tank 3 via a filter 4 to a further pump 5. From there, the fuel is pumped into a pressure chamber 6. With the aid of the pumps (2, 5), a relatively high pressure working on the fuel is present in the pressure chamber 6. A pressure control valve 7 and a pressure sensor 8 are connected to the pressure chamber 6. With the pressure sensor 8, the pressure can be measured which is present in the pressure chamber 6 and acts upon the fuel. The pressure sensor 8 generates an electrical signal which corresponds to the measured pressure and is applied via a line 9 to an electric control apparatus 10.

Four injection valves 11 are connected to the pressure chamber 6. Each of the injection valves 11 is directly assigned to a combustion chamber of the engine. The pressure chamber 6 is separated from the particular combustion chamber by the closed injection valve 11. The injection valves 11 are connected to the control apparatus 10 via electric lines 12. The control apparatus 10 generates an electric signal for driving one of the injection valves 11. With this signal, the corresponding injection valve 11 is controlled into its open state. The length of the signal corresponds to the injection duration during which fuel from the pressure chamber 6 is injected via the corresponding injection valve 11 into the corresponding combustion chamber of the engine.

Furthermore, the tank 3 is connected via a hydraulic line 13 to an active charcoal filter 14. The line 13 is connected to the tank 3 in such a manner that gaseous or vaporous fuel, which vaporizes in the tank 3, is taken up by the line 13 and can flow through this line to the active charcoal filter 14. There, the vaporized fuel is trapped so that the active charcoal filter 14 fills.

The active charcoal filter 14 must be regenerated so that the filter does not overflow. For this purpose, the line 13 leads from the active charcoal filter 14 via a magnetic valve 15 to an intake manifold 16 through which air is inducted and is supplied to the combustion chambers of the engine. By means of the inducted air, the vaporized fuel, which is inducted into the intake manifold 17, is supplied to the combustion chambers of the engine.

The magnetic valve 15 is connected via an electric line 17 to the control apparatus 10 and can be driven by the apparatus.

In a first operating mode (the stratified operation S of the engine), the fuel is injected by the injection valve 11 into the combustion chamber during a compression phase, which is caused by a piston; locally, in the immediate vicinity of the spark plug as well as, in time, directly ahead of top dead center of the piston. Then, with the aid of the spark plug, the fuel is ignited so that the piston is driven in the following work phase by the expansion of the ignited fuel.

In a second mode of operation (the homogeneous mode H of the engine), the fuel is injected by the injection valve 11 into the combustion chamber during an induction phase caused by the piston. Because of the air inducted simultaneously via the intake manifold 16, the injected fuel is swirled and therefore eventually uniformly distributed in the combustion chamber. Thereafter, the air/fuel mixture is compressed during the compression phase to then be ignited by the spark plug. The piston is again driven because of the expansion of the ignited fuel.

The fuel quantity or fuel mass, which is injected in the stratified operation S and in the homogeneous operation H, respectively, by the injection valves 11 into the combustion chambers is controlled (open loop and/or closed loop) by the control apparatus 10 especially with respect to a reduced fuel consumption and/or a reduced exhaust gas development. For this purpose, the control apparatus 10 is provided with a microprocessor which has a program stored in a storage medium especially a read-only-memory. This program is suitable to carry out the above-mentioned control (open loop and/or closed loop). Input signals are applied to the control apparatus 10 which define operating states of the engine measured by means of sensors and the control apparatus 10 generates output signals with which the performance of the engine corresponding to the desired control (open loop and/or closed loop) can be influenced via actuators.

The magnetic valve 15 is driven by the control apparatus 10 in such a manner that it is closed in the stratified operation S of the engine and is opened in the homogenous operation H of the engine. Fuel, which is vaporized in the tank 3, therefore reaches the intake manifold 17 only in the second mode of operation (the homogeneous operation H) via the open magnet valve 15 and therefore the combustion chamber(s) of the internal combustion engine. In the first mode of operation (the stratified operation S), however, no fuel, which is vaporized in the tank 3, reaches the combustion chambers of the engine.

This has the consequence that the active charcoal filter 14 is only regenerated in the homogeneous operation H but not in the stratified operation S. A control (open loop or closed loop) of the magnetic valve 15 by the control apparatus is provided in correspondence to FIG. 2 so that the active charcoal filter 14 also cannot overflow in stratified operation S.

Figure 2:
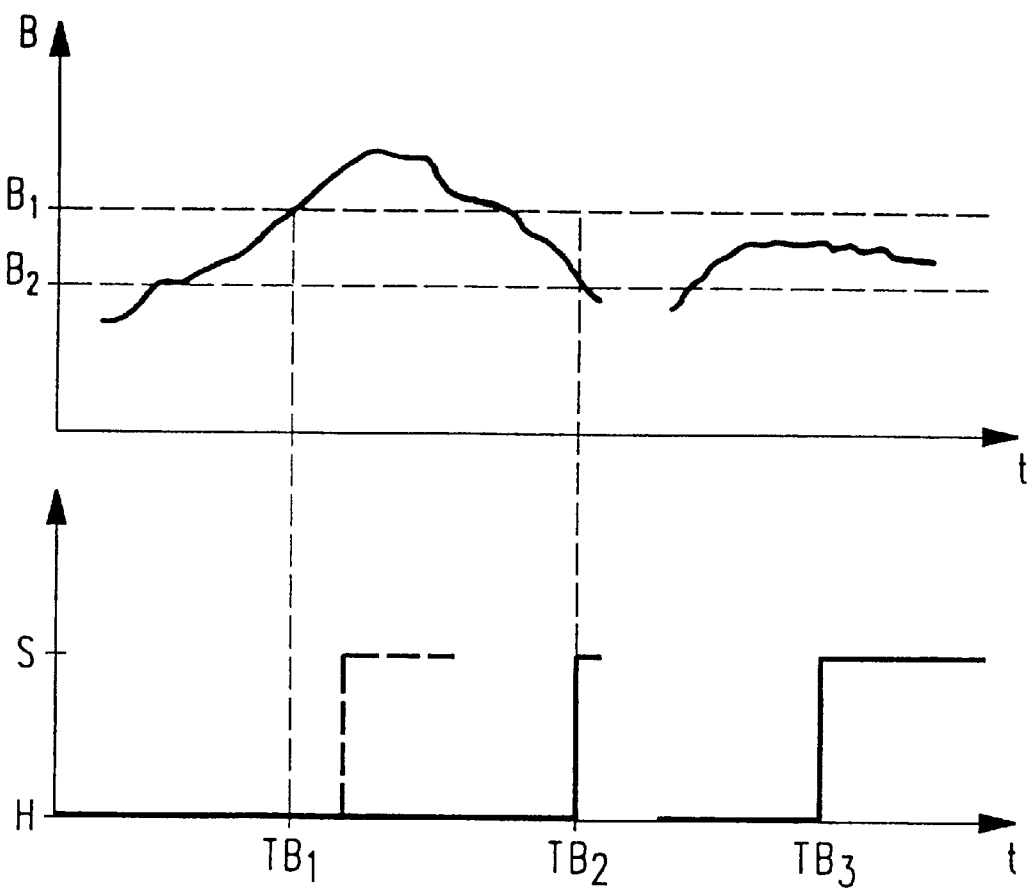
FIG. 2 shows a schematic time diagram of two states of the engine of FIG. 1; and, FIG. 3 shows a schematic time diagram of the states of FIG. 2 during the start of the engine of FIG. 1.

Corresponding to FIG. 2, a determination of the charge B of the active charcoal filter 14 by the control apparatus 10 is possible. This determination can be carried out with the aid of a lambda control which is present in the control apparatus 10. For an open magnetic valve 15, the lambda control must reduce the fuel mass injected by the injection valves 11 in order to compensate vaporized fuel which is added via the active charcoal filter 14. From this reduction, the control apparatus 10 can draw a conclusion as to the concentration and therefore as to the fill level or the charge B of the active charcoal filter 14. This charge B is shown in FIG. 2. Furthermore, in FIG. 2, it is shown in which mode of operation the engine is in each case, that is, in stratified operation S or in homogeneous operation H.

According to FIG. 2, the charge B of the active charcoal filter 14 increases with time t and exceeds a value B1 of the charge B at time point TB1. If the engine up to this time was in homogeneous operation H, it is then at first no longer possible after time point TB1 that the engine transfers into stratified operation S. This is shown by way of example in FIG. 1 by an incomplete transition (therefore shown by the broken line) into the stratified operation S.

Only when the charge B drops below a value B2 at time point TB2, can the engine be controlled (open loop and/or closed loop) by the control apparatus 10 into the stratified operation S. This is shown in FIG. 2 by a through and therefore solid line transition into the stratified operation S. The value B1 of the charge B of the active charcoal filter 14 is then greater or equal to the value B2 of the charge B.

The described retainment of the homogeneous operation H takes place only when the charge of the active charcoal filter 14 has exceeded the value B1. If the charge B was, on the one hand, greater than the value B2 but less than the value B1, then no retainment of the homogeneous operation H takes place; instead, in this case, a transition into stratified operation S can be made immediately by the control apparatus 10. This is the case at time point TB3 of FIG. 2.

The engine is adjusted in the sense of a homogeneous lean operation during the retainment of the homogeneous operation H so that the fuel consumption is as low as possible which is higher in comparison to a possible stratified operation S.

After the start of the engine, the charge of the active charcoal filter must likewise be considered in the drive of the magnetic valve 15 by the control apparatus 10. This is undertaken in FIG. 3 wherein, as in FIG. 2, the charge B of the active charcoal filter 14 and the mode of operation of the engine are applied against time t.

After the start of the engine at time point Tst, a check is continuously made by the control apparatus 10 as to whether the charge B of the active charcoal filter 14 can be determined. This is dependent, inter alia, on the mode of operation of the engine. This check takes place for a pregiven time duration.

Figure 3:
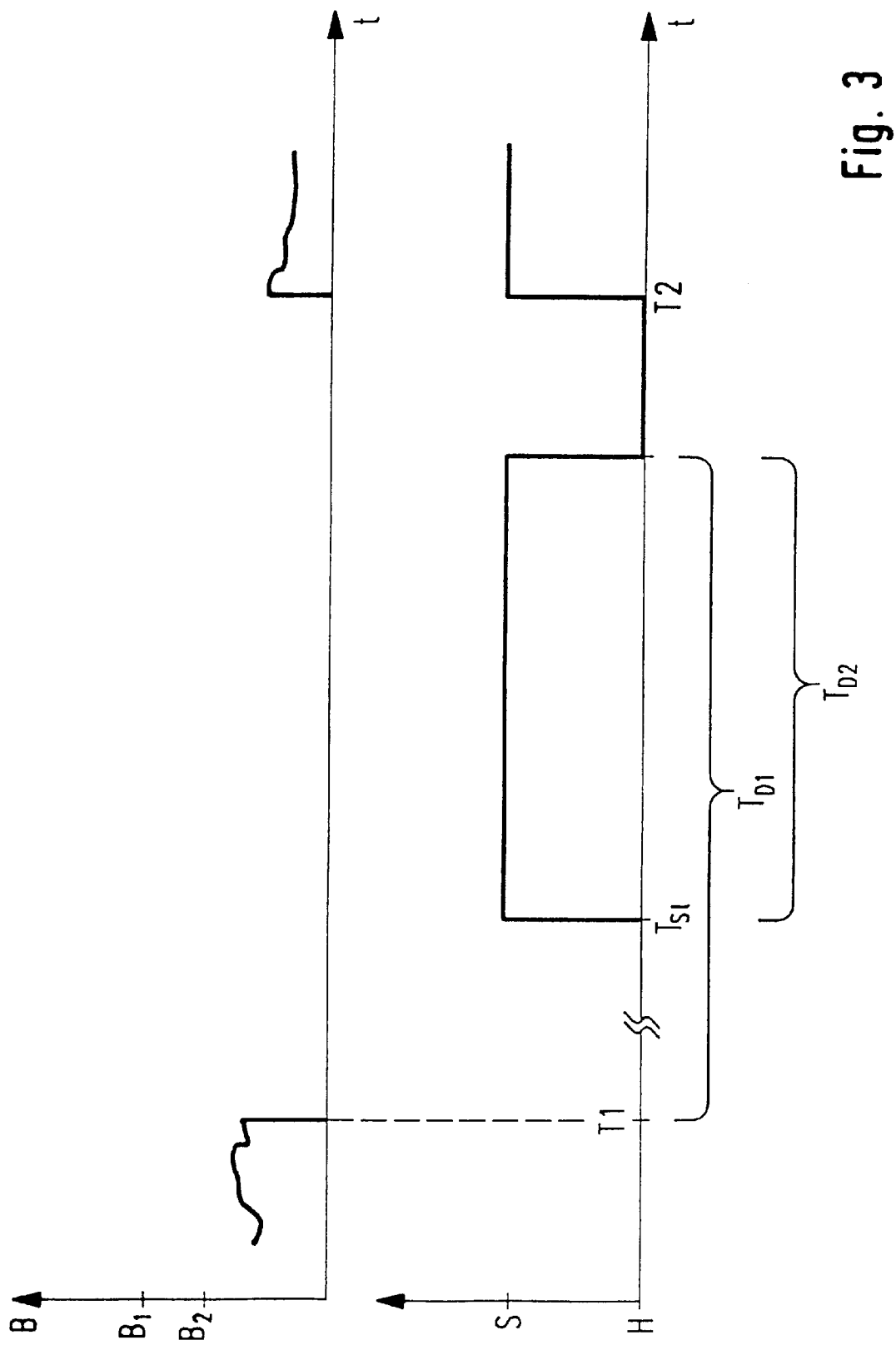

This time duration can be computed either from the last determination of the charge of the active charcoal filter 14, that is, from a time point T1, as shown in FIG. 3 with the time duration TD1 or, the time duration starting from the time point TSt of the start of the engine can be computed as shown in FIG. 3 with the time duration TD2. The time duration TD1 is usually significantly greater than the time duration TD2. Both time durations TD1 and TD2 can be changed especially in dependence upon the air temperature. The time durations TD1 and TD2 are shorter with higher air temperature.

If the charge B of the active charcoal filter 14 can be determined during this time duration TD1 or TD2, then this determined value is used for the control (open loop and/or closed loop) of the engine and especially for the control (open loop and/or closed loop) of the magnetic valve 15.

If, however, no charge B of the active charcoal filter 14 can be determined during this time duration TD1 or TD2, then the engine is transferred into homogeneous operation H and the magnetic valve 15 is opened in each case. This takes place in FIG. 3 at the end of time duration TD1 or TD2. In this way, vaporized fuel from the tank 3 can reach the intake manifold 17 and an overflow of the active charcoal filter 14 is avoided.

Furthermore, the homogeneous operation H is maintained at least until the charge B of the active charcoal filter 14 has been determined. This is the case in FIG. 3 at time point T2. The further control (open loop and/or closed loop) of the engine can be carried out by the control apparatus 10 with the then available value of the charge B.

Alternatively, it is also possible to transfer the engine immediately into the homogeneous operation H after the start end to retain this operation at least until the charge B of the active charcoal filter 14 has been determined.

What is claimed is:

1. A method for operating an internal combustion engine such as an engine of a motor vehicle, the engine operating in a first mode (S) of operation and in a second mode (H) of operation, the method comprising the steps of:

injecting fuel from a fuel tank directly into a combustion chamber of said engine when in said first mode (S) of operation during a compression phase and, when in said second mode (H) of operation, during an induction phase;

supplying vaporized fuel from the tank to the combustion chamber in the second mode (H) of operation; and, maintaining the second mode (H) of operation until the charge (B) of the active charcoal filter becomes less than a pregiven second value (B2).

2. The method of claim 1, comprising the further steps of:

conducting vaporized fuel through an active charcoal filter; and, determining the charge (B) of the active charcoal filter.

3. The method of claim 1, wherein the second mode (H) of operation is only retained when the charge (B) of the charcoal filter previously was greater than a pregiven first value (B1).

4. The method of claim 1, comprising the further steps of:

after the start (Tst) of the engine, checking as to whether a determination of the charge (B) of the active charcoal filter is present and, if no determination is present, transferring the engine into the second mode (H) of operation after a pregiven time duration (TD1 or TD2).

5. The method of claim 4, comprising the further step of computing the time duration (TD1) starting from the last present determination (T1) of the charge (B).

6. The method of claim 4, comprising the further step of computing the time duration (TD2) starting from the start (Tst) of the engine.

7. The method of claim 4, comprising the further step of retaining the second mode (H) of operation so long until a determination (T2) of the charge (B) of the active charcoal filter (14) is present.

8. The method of claim 1, comprising the further step of transferring the engine into the second mode (H) of operation after the start (Tst) until a determination of the charge (B) of the active charcoal filter is present.

9. An electric storage medium such as a read-only-memory for a control apparatus of an internal combustion engine such as an engine of a motor vehicle on which a program is stored which can be run on a computer apparatus such as a microprocessor, the engine operating in a first mode (S) of operation and in a second mode (H) of operation, the electric storage medium comprising said program adapted to carry out the method steps of: injecting fuel from a fuel tank directly into a combustion chamber of said engine when in said first mode (S) of operation during a compression phase and, when in said second mode (H) of operation during an induction phase; supplying vaporized fuel from the tank to the combustion chamber in the second mode (H) of operation; and, maintaining the second mode (H) of operation until the charge (B) of the active charcoal filter becomes less than a pregiven second value (B2).

10. An internal combustion engine such as for a motor vehicle, the engine operating in a first mode (S) of operation and in a second mode (H) of operation, the engine comprising:

a tank;

an injection valve for directly injecting fuel from said tank into a combustion chamber of said engine when in said first mode (S) of operation during a compression phase and, when in said second mode (H) of operation, during an induction phase;

a control apparatus for controlling (open loop and/or closed loop) the engine;

a line via which vaporized fuel from said tank can be conducted to the combustion chamber in the second mode (H) of operation; and, means for maintaining the second mode (H) of operation until the charge (B) of the active charcoal filter becomes less then a pregiven second value (B2).

11. The internal combustion engine of claim 10, further comprising an active charcoal filter which is connected into said line.

12. The internal combustion engine of claim 11, further comprising a blocking element such as a magnetic valve connected into the line.

13. The internal combustion engine of claim 12, comprising: an intake manifold arranged forward of the combustion chamber; and, said line opening into said intake manifold.

* * * * *